April 30, 1935.  G. GORTON  1,999,900
WORKTABLE FOR MACHINE TOOLS
Filed March 14, 1934  2 Sheets-Sheet 1

Inventor
George Gorton
By Hubert E. Pick  Attorney

April 30, 1935.  G. GORTON  1,999,900
WORKTABLE FOR MACHINE TOOLS
Filed March 14, 1934   2 Sheets-Sheet 2

Inventor
George Gorton
By Hubert E. Peck Attorney

Patented Apr. 30, 1935

1,999,900

UNITED STATES PATENT OFFICE 1,999,900

WORKTABLE FOR MACHINE TOOLS

George Gorton, Racine, Wis.

Application March 14, 1934, Serial No. 715,561

13 Claims. (Cl. 90—58)

This invention involves improvements in work tables for various machines that are adapted to operate on various materials; and the objects and nature of the invention will be understood by those skilled in the art in the light of the following description of the accompanying drawings that illustrate the preferred mechanical expression or embodiment of the invention from among other constructions and organizations within the spirit and scope thereof.

An object of the invention is to provide machine tools and other machinery for operating on material held or supported by work tables or holders with improved supporting and adjusting mechanism for such work holder or table having the ends in view of accuracy in and ease of adjustment, simplicity and possible rigidity.

And a further object of the invention is to provide a work holder or table with highly advantageous mechanism for supporting and adjusting the same.

With the foregoing and other objects in view that will become apparent as the following description proceeds, my invention consists in certain novel features, organizations, and arrangements and in combinations, as more fully and particularly explained and specified hereinafter.

Referring to the accompanying drawings, forming a part hereof:—

Figure 1:
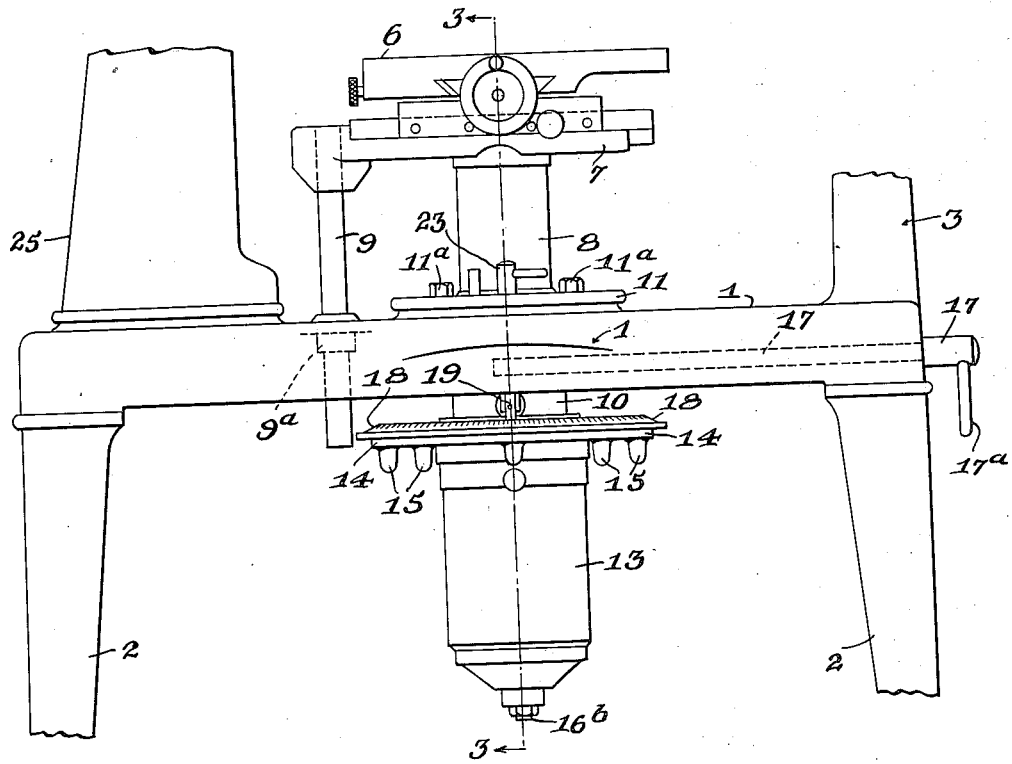
Fig. 1 shows, in part, an engraving or modeling duplicating machine, in front elevation, embodying my invention, as illustrative of any other machine in which my invention can be employed.
Figure 2:
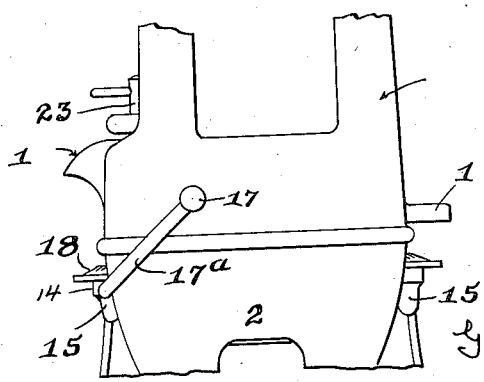
Fig. 2 shows the base portion and work table of the machine in end elevation.
Figure 3:
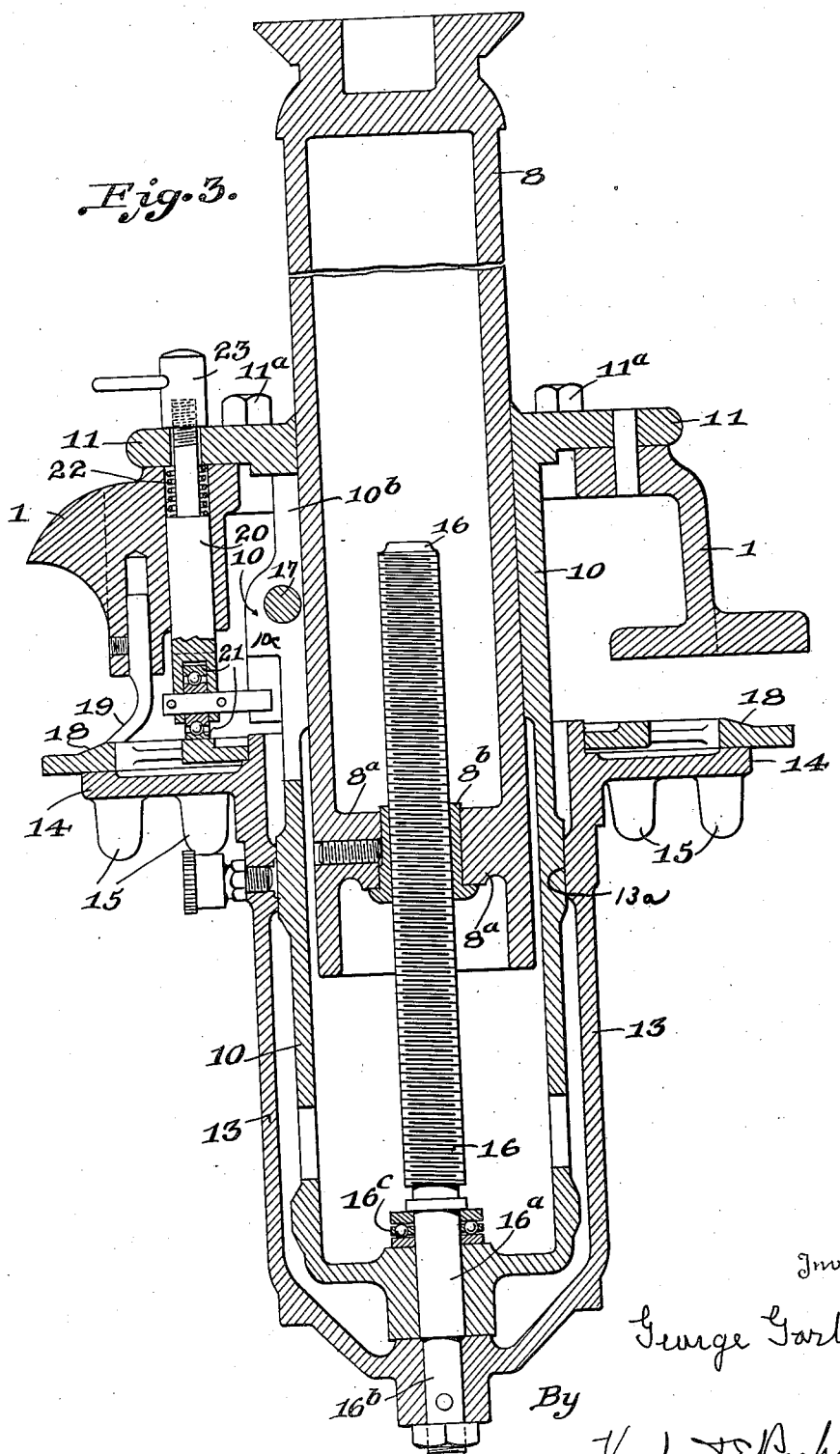
Fig. 3 is a central vertical section on a larger scale taken in the plane of the line 3—3, Fig. 1.

In the drawings, I show a cutter 35, to operate on work of any suitable material held in operative position with respect to the cutter by any suitable work holder, and the work table 6 that I happen to illustrate, for purposes of explanation, is illustrative, broadly, of any suitable work holder with which my invention, in any embodiment thereof, can be associated.

The cutter 35 is carried and operated by any suitable machine with which my invention can be included or with which it can be associated, whether the cutter 35 is of the rotary driven type as herein illustrated, or of some other type.

In the example illustrated, the machine is provided with a supporting frame that includes a horizontally disposed rigid elevated base 1, supported by end legs 2, and the base 1, carries the work table through the medium of supporting and adjusting mechanism of my invention. The example work table 6, that I happen to illustrate, embodies a common form including various slides and feed means for adjusting say, the top table forwardly and rearwardly on the second table, and the second table longitudinally to carry the top table laterally. These two tables are carried by a supporting base, and are adjustable horizontally relatively to the table base 7.

This entire table organization, i. e., the two slides and the table base 7, is carried and adjustable vertically by and held at the elevation to which adjusted, by a vertical slide post, shank, leg, or column 8, normally operatively rigid with and depending centrally from the table base 7. This vertical column 8 is longitudinally elongated, usually cylindrical, and of strong, rigid structure to uphold the work holder against lateral vibration and to withstand the stresses to which the work is subjected by the action of the cutter thereon.

The column 8 and the work holder, can be, if so desired, braced against lateral vibration as well as held against rotary movement on the longitudinal axis of said column, by a stiff vertical slide rod 9, eccentrically arranged with respect to column 8, and rigid with and depending from the work holder base 7, and passing slidably through a vertical passage 9a, in the machine table or base 1, and snugly fitting therein and yet freely slidable therethrough.

In the particular example, illustrated, of a work holder, the work or material to be operated on by the cutter 35, is clamped or otherwise fixed on the top table 6, so that said work will be operatively arranged with respect to the cutter 35, and this often requires exceedingly accurate vertical adjustment of the work holder to locate the work at the exact elevation required, and in some instances, it is desirable to predetermine the maximum cutting depth of the cutter in the work by accurate vertical adjustment of the work holder rather than by adjustment and control of the cutter, or even to accurately feed the cutter into the work by accurate vertical work holder adjustment, instead of by cutter feed adjustment.

For accomplishing these accurate adjustments, I show as an example of one embodiment of this portion of my invention the following organizations:

The column 8 is slidable vertically in a vertically-elongated guide sleeve 10, depending through a vertical aperture therefor in the bed 1, at its upper end having an exterior annular rim 11, resting on and normally rigidly fixed to the bed 1.

The rim 11, is usually clamped to the bed by suitable means, such as bolts 11a.

The portion of the column 8 below the level of the sleeve rim 11 is housed by sleeve 10 and snugly fitted therein, against lateral play and for longitudinal sliding movement when released for adjustment.

The portion of the sleeve 10, located below the bed 1, and depending from the under side thereof, is housed by and depends within a long rotary lubricant retaining cup or container 13 that forms the long vertical hub or barrel of an otherwise horizontal rotary hand wheel 14, in the form of an annular external horizontal flange rigid with the upper end of cup 13, and usually having an annular series of depending handles or lugs 15, rigid therewith by which the wheel can be conveniently rotated on and relatively to the sleeve 10.

The wheel barrel or hub 13 is centered and mounted to rotate on sleeve 10; the sleeve having an exterior cylindrical surface on which on internal concentric cylindrical portion 13a, of the barrel 13 has bearing. The non-rotary but vertically adjustable work table column 8 is tubular or hollow and open at its lower end within the interior of sleeve 10, depending below the column. The interior of the lower end portion of the column is bridged by a relatively narrow, vertically-open spider or web 8a, having a central vertical bore extending therethrough alined with the longitudinal axis of the column, and within this bore is normally fixed a non-rotary internally screw threaded nut 8b, the internally screw threaded bore of which is alined with the column longitudinal axis. A central longitudinally-elongated vertical rotary feed screw 16, extends through and meshes with non-rotary nut 8b, and is arranged longitudinally of and within the column 8, and sleeve 10, and at its lower end portion is cylindrical to form journal 16a, extending through and mounted to rotate in the bearing formed by a vertical bore through the lower end wall or bottom cross portion of the sleeve 10, with the lower end extremity 16b, of said screw 16, entering and normally fixed in the bottom wall of the rotary lubricant container 13, to rotate therewith, and form a seal with said container bottom against lubricant leakage.

If so desired, an end thrust bearing 16c, for the screw 16, can be arranged between an annular shoulder above journal 16a, and the top of the transverse bottom wall or bridge of sleeve 10.

By rotation of the wheel 14—15, the feed screw can be rotated to raise and lower the column 8, and thus adjust the work table to the elevation desired, in which the table will be held by the self-locking action of the screw 16, and nut 8b.

Supplemental means can be provided if so desired, for locking the column against accidental axial and/or vertical movement after setting at the desired adjustment by the wheel, screw and nut. For instance, the upper portion of the sleeve 10 can be longitudinally split at 10b, above the lubricant level in the sleeve and container 13, with separate opposing exterior vertical flanges 10c, rigid with the sleeve at opposite sides of the split, formed with alined holes for the passage of the screw threaded portion of a rotary clamping shaft 17, and reception of a clamping nut and shoulder, whereby said split portion of the sleeve can be contracted to tightly grip the column 8, or can be released to expand, and free the column for vertical sliding adjustment. In the example shown, the rotary clamping shaft 17 is supported under the bed 1, and has an exposed operating handle 17a, beyond the right hand end of the bed with reference to Fig. 1.

The long cup or barrel 13 of the wheel is formed to be filled with lubricant to the desired level, and to retain the same to a level to lubricate the screw 16, and consequently nut 8b, the lower exterior surface of column 8, the bearings 16a and 16c of the rotary screw and the centering bearing surface 13a of the barrel 13, on sleeve 10, which sleeve is formed with openings to the interior of the barrel so that the oil level can be the same as in barrel 13, and furthermore, said container forming barrel 13 houses said parts against dust and dirt and protects the same against injurious exterior blows and shocks.

I provide a visible accessible graduated dial centered on the horizontal bearing top surface of the annular hand wheel 14. This dial is in the form of a radially wide flat annulus or ring 18, the flat smooth bottom surface of which rests on annular flat top surfaces of said wheel to permit relative rotary sliding movement of the ring on the wheel, by hand for certain adjustment or setting purposes. The ring projects outwardly from the wheel or is otherwise visible and accessible for independent rotation by hand. The ring is provided with top or otherwise visible graduations indicating different elevations of the work table, attainable by the length of axial movement of the hand wheel, and these graduations are to be read in connection with a visible index or zero point 19, fixed to or located on the rigid bed 1.

I provide means whereby the dial ring 18, can be locked or held to rotation with the hand wheel, and whereby said dial ring can be easily released for independent rotation on said wheel for setting with respect to index 19. For instance, I show a ring-locking vertical plunger 20, vertically movable in a slideway provided therefor in rim 11, and bed 1, and at its lower end carrying a wheel or roller 21, normally bearing down on an annular flat top surface of the dial ring 18, and having its axis arranged radially of said ring. This plunger is normally forced downward by coiled spring 22, under sufficient power to press the dial ring by roller 21, against hand wheel 14, to rotate therewith without slip. In other words, the spring pressure delivered through roller 21 will cause the hand wheel and dial ring to rotate as one, when the hand wheel is rotated to raise or lower the work table.

To free the dial ring from the pressure of spring 22, through roller 21, for independent rotation on the hand wheel, I provide means for elevating the plunger and the roller 21, from pressure applying relation to the dial ring. To this end, I screw thread the reduced upper end of non-rotary plunger 20, and extend the same upwardly above rim 11, and provide said upwardly projected threaded plunger end with an accessible handled rotary nut 23, meshing therewith, with the lower end of the nut adapted to abut the top surface of rim 11. When this nut is rotated in one direction it will bear on said rim and draw the plunger upwardly, compressing spring 22, and lifting roller 21 from the dial ring. When the nut is rotated in the opposite direction, it permits plunger 20 to descend under the expanding power of the spring and apply the desired pressure on the dial ring through the roller, to lock the dial ring to the hand wheel.

When the roller 21, has been lifted to relieve the pressure locking the dial ring to the hand wheel, the dial ring can be rotated on the hand wheel a distance indicated by a certain number of graduations on the ring read in connection with the index or zero mark; the plunger can then be released to drop and lock the dial ring to the hand wheel, and the hand wheel can then be rotated to move the work table vertically the distance indicated by said number of graduations, i. e., until said number of graduations have moved past the index, and the work or the work table is located at the exact elevation desired with respect to the cutter.

The hand wheel 14, in cooperation with the dial ring and index, can likewise be employed to cause relative movement between the work and cutter during cutter operation as the equivalent of feeding the cutter into the work, up to the predetermined limit of cutter working depth in the work.

Disclosure of one example of an embodiment of the invention is made hereby for purposes of explanation and not for strict limitation purposes, as it is my desire to cover my invention both as broadly and as specifically as legally possible under the prior art, particularly as various changes, modifications, departures, additions to and/or omissions from the disclosure, are possible within the spirit and scope of the invention.

What I claim is:—

1. In combination, a bed; a vertically adjustable table; a rotary member; a screw feed mechanism rotating with said member for vertically adjusting said table; a dial ring slidably resting on and engaging said member and having top visible concentric graduations; a normally fixed index for reading with said graduations; and a pressure device supported from said bed against travel with said ring and said member and normally pressing said dial ring against said member for holding the ring thereto to rotate therewith, said device provided with manually actuated means exposed and accessible exteriorly of said ring and said bed and operative to temporarily relieve the pressure of said device on the ring, to permit independent rotation of the ring with respect to the member for setting the ring with respect to the index and member.

2. In combination, a vertically adjustable table having a depending tubular supporting column; a supporting sleeve fixed against normal vertical movement, in which the column slides longitudinally; said column having a non-rotary nut; a rotary feed screw meshing with said nut and upstanding in the column and sleeve and mounted in the sleeve for rotation and against axial movement; and an elongated lubricant-retaining exterior barrel mounted to rotate on and extending below the sleeve and fixed to said screw to rotate the same and provided with an exterior hand wheel.

3. In combination, in a machine tool; a supporting bed providing a vertical guideway; a work table provided with and supported by a non-rotary depending column slidably fitting and vertically adjustable in said guideway; a vertical rotary lubricant retaining receptacle having screw threaded connection with said column for raising and lowering the same to adjust the elevation of said table, by relative rotation of said receptacle, said receptacle being arranged exteriorly and longitudinally with respect to said column to retain lubricant for lubricating said screw threaded connection and surfaces of said column.

4. In a machine tool, in combination, a relatively-fixed, vertical supporting sleeve; a rotary feed screw arranged longitudinally of said sleeve and carried thereby against relative longitudinal movement and for relative rotary movement; a work table provided with a depending supporting column supported by and slidable vertically in said sleeve for table vertical adjustment, said column longitudinally receiving said feed screw and provided with a feed nut in mesh with the screw whereby rotation of the screw will raise or lower the column with respect to the sleeve and screw; a longitudinally elongated rotary hub arranged exteriorly and longitudinally of said sleeve and centered and rotatable thereon and exteriorly protecting and enclosing at least the lower portion thereof and operatively coupled to said screw for actuating the same; and exteriorly accessible means for rotating said hub.

5. In a machine tool, in combination; a fixed vertical supporting sleeve; a work table having a base provided with a rigid depending supporting column supported by and vertically slidable in said sleeve for table vertical adjustment; and mechanism for adjusting said column vertically in said sleeve and for holding the same in the position to which adjusted, including a longitudinally-elongated barrel exteriorly centered and rotatable on said sleeve and enclosing a substantial portion of the length thereof and depending below the same and forming a lubricant retaining receptacle, a screw threaded feed connection between said barrel and said column for raising and lowering the column by rotation of said barrel, said connection being enclosed within the barrel and sleeve for lubrication by the lubricant therein, and means for rotating said barrel.

6. In combination; an adjustable work table; a supporting frame therefor; screw feed means for adjusting said table relative to said frame, said means including an exterior feed actuating wheel providing a concentric annular top seat; a horizontal dial ring having a top scale, said ring resting on said seat for rotation with the wheel by frictional engagement therewith when pressed thereto, and loosely resting on said seat for free relative rotation when released from said pressure; and a spring-pressed plunger normally exerting downward pressure on said ring to hold the same to rotation with said wheel, said plunger being supported against lateral travel with said ring and confined to movement toward and from said ring; said plunger being provided with exteriorly arranged and accessible manually-actuated means for elevating and temporarily holding the plunger withdrawn from operative pressing association with said ring.

7. In combination; a supporting bed; a work table adjustable with respect thereto; means for feeding said table including a rotating wheel having a smooth surface annular seat; a dial ring resting on said seat to rotate with the wheel when pressed down thereonto into frictional holding contact therewith, and capable of being manually rotated with respect to the wheel when relieved of said pressure; and a pressure device held against lateral travel with said ring for normally exerting pressure on said ring to hold the same to travel with said wheel; and accessible manually-actuated means for withdrawing said device from operative pressing association with said ring and for thus temporarily holding the same withdrawn.

8. In combination; a supporting bed; a work table adjustable vertically with respect to said bed; means for adjusting said table vertically including a horizontally rotating wheel having an annular concentric dial ring seat; a dial ring resting on said seat to rotate with said wheel when pressed against said seat and to rest loosely on said seat for manual rotation with respect to said wheel, when relieved from said pressure; and a pressure device supported by said bed against lateral travel with said ring and including a rolling contact against which said ring travels when rotating with the wheel, said device normally exerting pressure on said ring through said contact to hold the ring to rotation with the wheel, said device provided with exterior manually operated means for temporarily relieving the pressure of the contact on the ring to permit rotation of the ring relatively to the wheel.

9. In combination; a supporting bed; a work table; means for adjusting said table vertically with respect to said bed including a horizontally rotatable wheel; a dial ring resting loosely on said wheel to rotate therewith when pressed against the wheel, and capable of being rotated by hand on the wheel when relieved from said pressure; and a spring pressed plunger carried by said bed and provided with a rolling contact normally held pressed against said dial by said plunger to hold the ring to rotation with the wheel, said plunger having an operating handle accessible at the exterior of the bed, provided with screw thread connection with said plunger to withdraw the same and said contact from operative pressing association with said ring.

10. In combination; a supporting bed; a work table adjustable with respect thereto; means for adjusting said table, including a rotatable member having an annular horizontal dial ring seat; a separate dial ring resting on said seat and capable of being manually relatively rotated thereon in sliding engagement with said seat; and a pressure device supported by said bed against lateral travel with the ring and member, said pressure device including a rolling contact normally held bearing down on said ring and holding said ring in frictional contact with said seat to rotation by and with said member.

11. In combination, in a machine tool; a support providing a relatively fixed vertical guide sleeve; a work table having a depending supporting column fitting and for table adjustment, slidable vertically in said relatively fixed supporting sleeve; and a nut and screw feed for raising and lowering said column, said feed being operatively associated with the sleeve and column, and provided with an exterior vertically-elongated rotary lubricant cup for actuating said feed, with the feed and sleeve dipping into said cut for lubrication.

12. In combination; a support providing a fixed guide sleeve; a work table including its base, arranged above said support and said sleeve; a round non-rotary column supporting said table, and parallel with and complementary to said sleeve for longitudinally sliding therein to raise and lower said table, said column being centrally arranged with respect to said table base and depending therefrom and normally fixed thereto; a slide rod parallel with and spaced laterally from said column and depending from and fixed to said table base and at its lower portion confined to said support against lateral movement and in sliding engagement, to laterally brace said table base and hold said central column against rotary movement in said guide sleeve; and mechanism applied to said column for raising and lowering said table.

13. In combination; a work table including its base; a work table supporting slide column centrally arranged with respect to said base and depending therefrom and at its upper end fixed thereto; a work-table-bracing, depending slide rod to hold said base against rotary movements on the longitudinal axis of its said supporting column, said rod being spaced laterally from and parallel with said supporting column and at its upper end fixed to said table base; a support providing encircling guide ways below said table complementary to and snugly receiving and surrounding said column and said rod, respectively, in longitudinal sliding engagement and against lateral movements; means for normally securing said column against vertical movement with respect to its guideway and said support to hold the table at the elevation to which adjusted; and mechanism for adjusting said table vertically by sliding said column longitudinally in its encircling guideway including screw-threaded feed nut and complementary threaded means applied to the lower portion of said column.

GEORGE GORTON.